RECORD PLAYER

Filed June 5, 1964

6 Sheets-Sheet 1

INVENTORS
WARREN M. MINER
AKIRA A. YAMASAKI
BY Raymond W. Colton
ATTORNEY

May 7, 1968 W. M. MINER ETAL 3,381,967

RECORD PLAYER

Filed June 5, 1964 6 Sheets-Sheet 2

INVENTORS
WARREN M. MINER
AKIRA A. YAMASAKI
BY Raymond Wootton
ATTORNEY

RECORD PLAYER

Filed June 5, 1964 6 Sheets-Sheet 3

INVENTORS
WARREN M. MINER
AKIRA A. YAMASAKI
BY
Raymond Wheaton
ATTORNEY

RECORD PLAYER

Filed June 5, 1964 6 Sheets-Sheet 4

INVENTORS
WARREN M. MINER
AKIRA A. YAMASAKI
BY Raymond Wootten
ATTORNEY

RECORD PLAYER

Filed June 5, 1964 6 Sheets-Sheet 5

INVENTORS
WARREN M. MINER
AKIRA A. YAMASAKI
BY
Raymond Wootton
ATTORNEY

INVENTORS
WARREN M. MINER
AKIRA A. YAMASAKI
BY Raymond W. Colton
ATTORNEY

United States Patent Office 3,381,967
Patented May 7, 1968

3,381,967
RECORD PLAYER

Warren M. Miner, Brooklyn, and Akira A. Yamasaki, Tappan, N.Y., assignors to The Solocast Company, a corporation of Connecticut Filed June 5, 1964, Ser. No. 372,815
11 Claims. (Cl. 274—13)

This invention relates to a compact portable record player and particularly to an arrangement for moving the stylus over the surface of the record for playing or for return to starting position.

One feature of the invention is an arrangement for mounting the stylus for rectilinear movement over the record and for moving the stylus at a speed to follow the record groove. Another feature is a separate drive for the stylus to return it to starting position at a faster rate. Another feature is a lead screw rod for moving the stylus carriage with the rod driven from the turntable. Another feature is a frictional connection between the turntable and the rod so that the latter may be separately driven for movement of the carriage at a different rate as in returning the stylus to starting position.

One feature of the invention is a stylus drive at a faster than playing rate and separate from the playing rate drive. Another feature is the traverse of the stylus carriage from the turntable when the latter is rotated from the record, the latter, in turn, being driven by means separate from the turntable.

In accordance with the invention the record player stylus is mounted on a carriage having rectilinear movement parallel to the record for advancing or retracting the stylus and the carriage is driven selectively from the turntable or by a separate driving means through a lead screw engaged by followers on the carriage with a friction clutch provided between the turntable and rod so that the other driving means may be operative without disengagement of the main driving means.

Other features and advantages will be apparent from the specification and claims, and from the accompanying drawings which illustrate an embodiment of the invention.

Figures 1, 2:
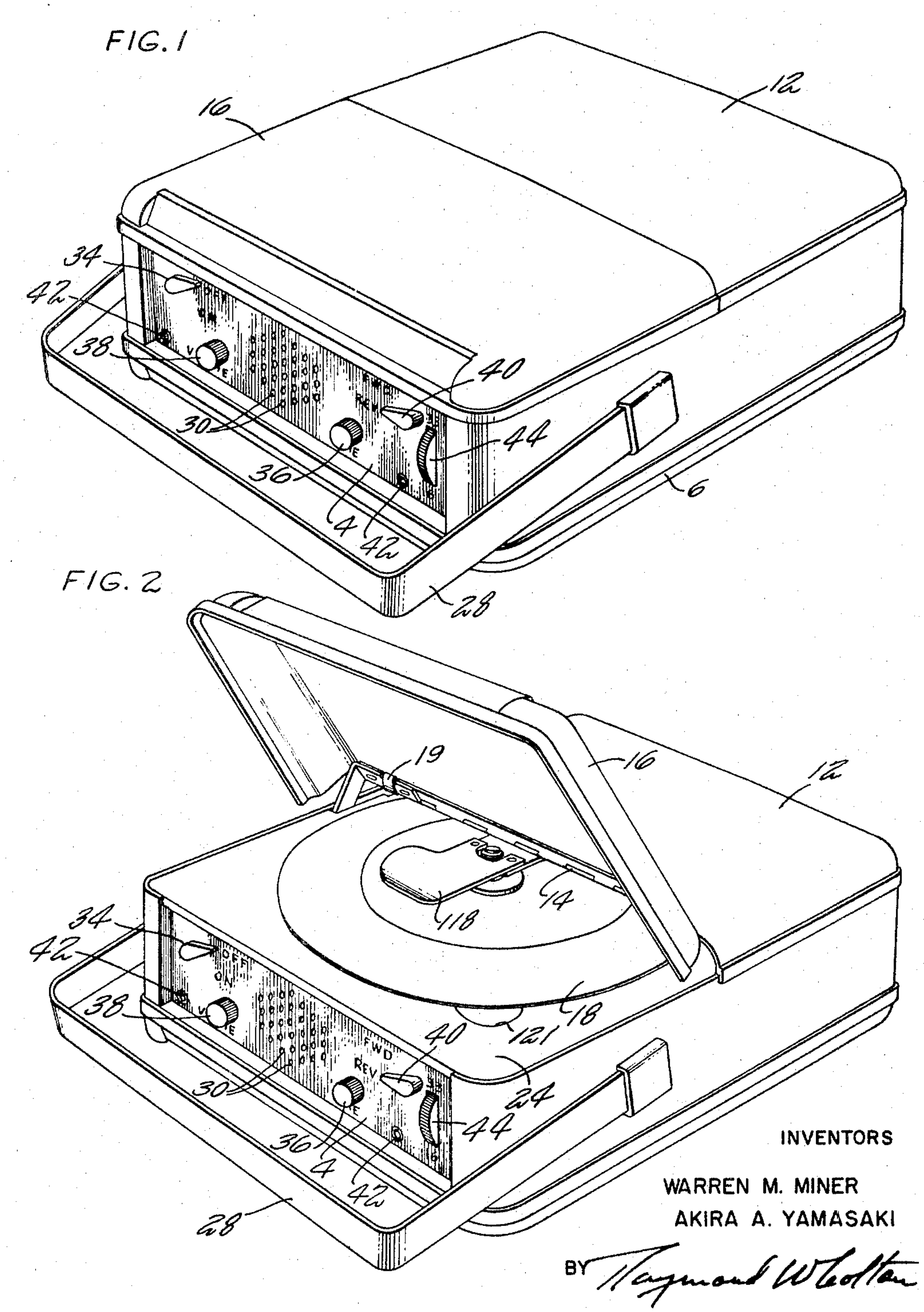
FIG. 1 is a perspective view of the device with the cover closed.
FIG. 2 is a view similar to FIG. 1 with the cover open.
Figure 3:
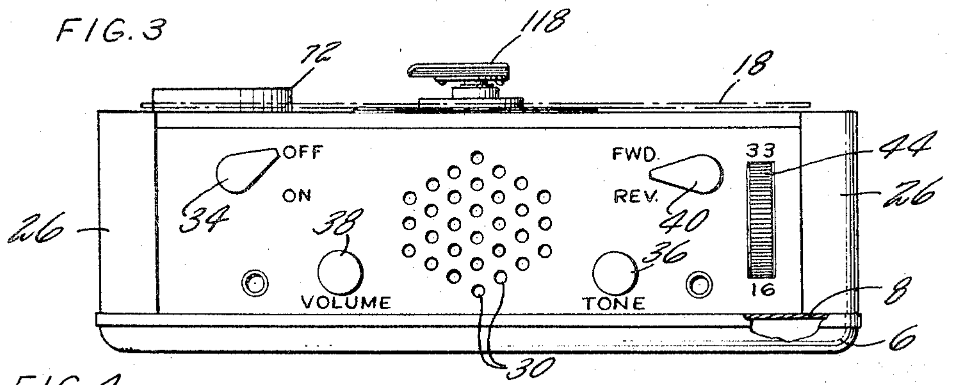
FIG. 3 is a front view with the cover removed.

The device includes a chassis having a front panel 4 on which the external controls are mounted. A bottom cover 6 is secured to the bottom plate 8 of the chassis in spaced relation thereto.

A top cover plate 12 is attached to the chassis and has a hinge 14 substantially midway between the front and back to provide, in effect, a cover 16 which is opened for the removal of and insertion of a record 18. The cover is held selectively in open or closed position by a spring 19. The cover 16 carries an actuating arm 20, see also FIG. 17, the inner end of which carries a cam engaging roller 22, the function of which will be described later.

Figure 5:
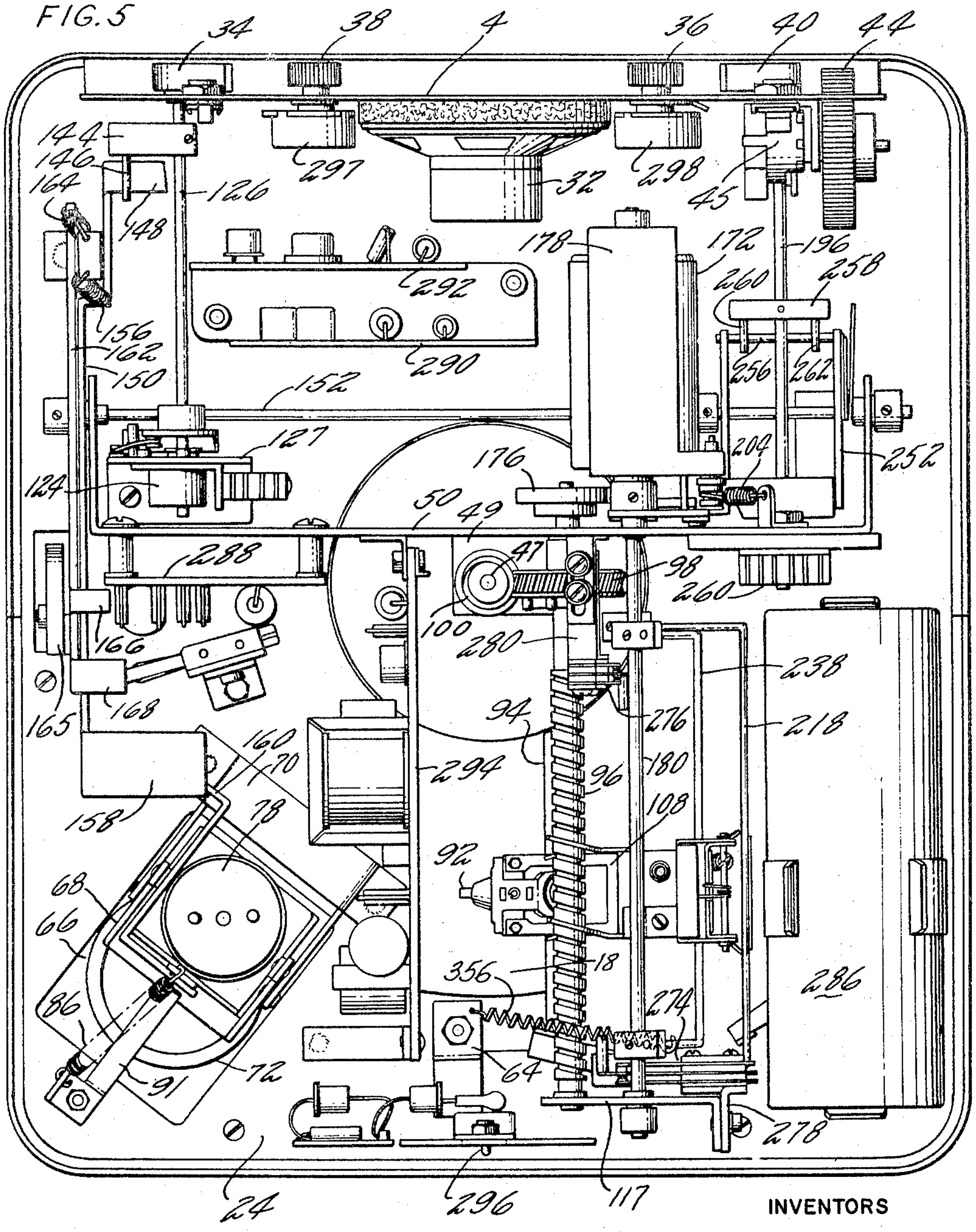
FIG. 5 is an inverted plan view of the mechanism with the bottom cover and a part of the chassis removed.

The chassis includes a top plate 24 to which substantially the entire mechanism is attached and which also carries the front panel 4, as shown in FIG. 5. The bottom plate 8 of the chassis has side walls 26 and an end wall, not shown, which form enclosures for the mechanism when the bottom plate and top plate are secured in assembled relation.

The control panel has a centrally located grill 30 in back of which is located a loud speaker 32. The panel also carries an on-off control lever 34. Other controls, not a part of the present invention, are a tone control 36, a volume control 38, and a scanning lever 40 and a speed control disc 44 operating a rheostat 45.

Figure 4:
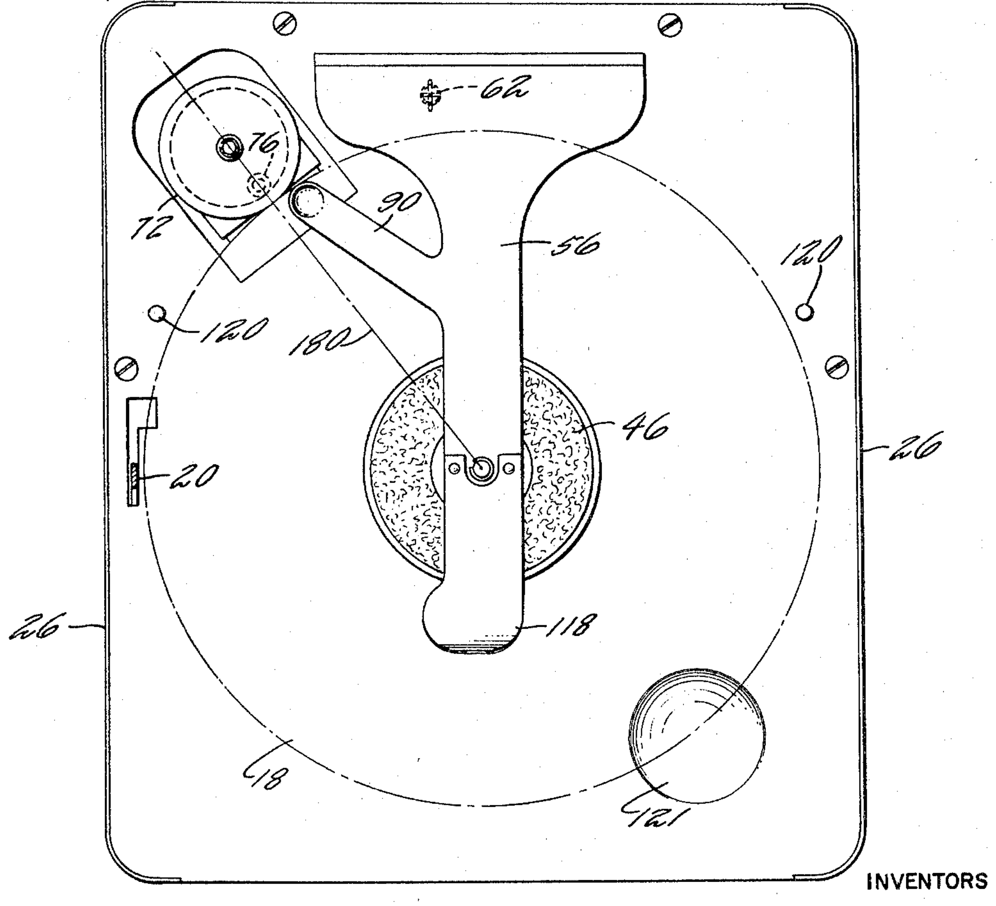
FIG. 4 is a top view with the cover removed.
Figures 6, 7, 8, 9, 10:
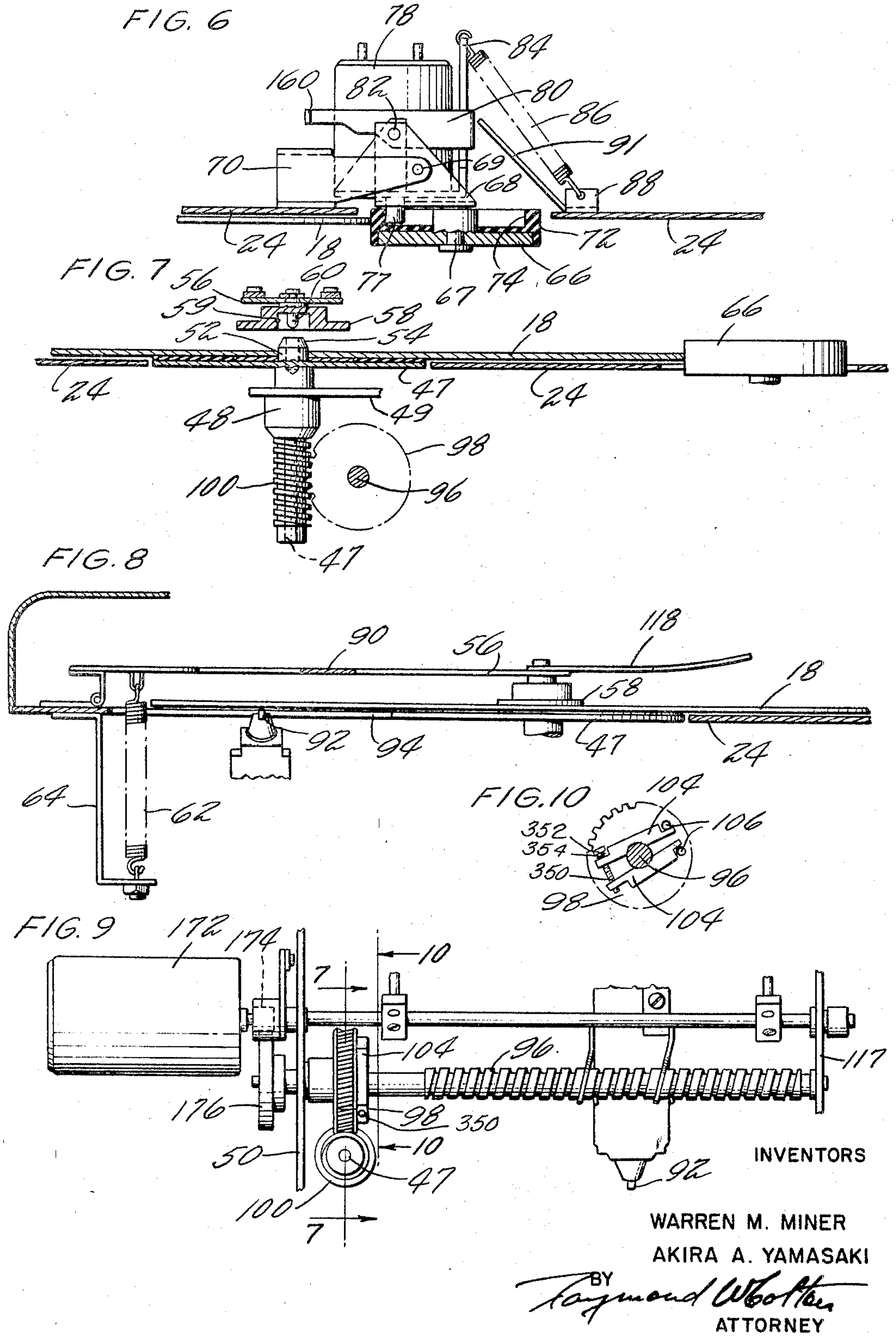
FIG. 6 is a partial side elevation of the device of FIG. 5 with parts in section showing the driving mechanism for the record.
FIG. 7 is a sectional view through the turntable mechanism; a part of this view being along the line 7—7 of FIG. 9.
FIG. 8 is a fragmentary sectional view through the cover, and the hinged hold-down arm for the record.
FIG. 9 is a plan view of the stylus moving mechanism.
FIG. 10 is a sectional view substantially along the line 10—10 of FIG. 9.

Referring now to FIGS. 4 and 7, the record 18 is supported on a turntable 46 having a shaft 47 journalled in a bearing 48 carried by a bracket 49 on an intermediate frame member 50, FIG. 5, of the chassis. The record is supported between the top plate 24 of the chassis and the cover plate 12 and is held in position on the turntable by a central hollow pin 52 extending from the turntable. The upper end of this pin may be conical as at 54 to assist in positioning the record on the turntable. A hinged arm 56 secured to the top plate 24 carries a hold-down disc 58 that engages the surface of the record opposite to the turntable. The disc has a central recess 59 to receive the pin 52 and has a central projection 60 that fits within the hollow pin 52 thereby forming a bearing for the pin. In this way, the hinged arm 56 serves as an additional support or bearing for the turntable on the side opposite to the bearing 48 so that the record is securely held in position within the device with no tilting of the turntable possible. The arm 56 is held in operative position with the hold-down disc engaging the record by a spring 62 extending between the underside of the arm 56 and a bracket 64, FIG. 8, on the chassis.

The record is driven by a driving pulley or wheel 66, FIGS. 6 and 7, journalled on a pin 67 in a bracket 68 which is pivotally supported as by pins 69 on a fixed bracket 70, the latter being attached to the top plate 24. The wheel 66 has a peripheral flange 72, the outer peripheral surface of which engages with the periphery of the record 18, as will be apparent. The inner peripheral surface 74 of the flange is engaged by a projection on the shaft 77 of a drive motor 78. The motor is mounted on a bracket 80 pivotally mounted as at 82 on the bracket 68. The pivotal mounting for the motor is parallel to and spaced from the pivotal mounting for the bracket 68 and both of these pivotal mountings are parallel to the plane of the record.

The bracket 80 has a projecting arm 84, the free end of which is connected by a spring 86 to a mounting bracket 88 attached to the top plate 24. In this way the spring 86 normally urges the pulley 76 into engagement with the driving wheel 66 and also urges the driving wheel against the periphery of the record. To prevent buckling of the record 18, the hinged arm 56 may have a projecting finger 90 which overlies the periphery of the disc adjacent to the point of contact of the driving wheel with the record. A fixed stop 91 on the plate 24 limits the pivotal movement of the motor and wheel in a clockwise direction, FIG. 6.

The record is played through a stylus 92 which engages with the side of the record adjacent to the top plate 24, this side being opposite to the cover plate 12. In effect, this can be considered the underside of the record and the stylus engages the record through a slot 94 in the top plate. The stylus is caused to move radially of the record as the record is rotating through a helically grooved lead screw 96, the latter being rotated by the rotation of the turntable on which the record is carried.

The lead screw 96, FIGS. 5 and 9, has mounted thereon a worm gear 98 which is driven from a worm 100 on the shaft 47 for the turntable. The worm gear carries two clutch elements 104, FIG. 10, on the face thereof in the form of blocks which are in a position to engage on opposite sides of a smooth portion of the lead screw 96 and thereby provide a frictional drive from the worm gear to the lead screw. It will be apparent that the clutch elements will provide a substantial frictional effect dependent on the position of an adjusting screw 350 having a spring 354 under its head 352. The elements 104 are supported at their ends remote from the screw 350 between a pair of pins 106 projecting into the worm gear. With this arrangement the turntable which is rotated as a result of the record being driven will in turn provide a rotation of the lead screw 96 in proper timed relation to the rotation of the record to traverse the stylus at the appropriate rate to keep the stylus in the record groove.

Figure 11:
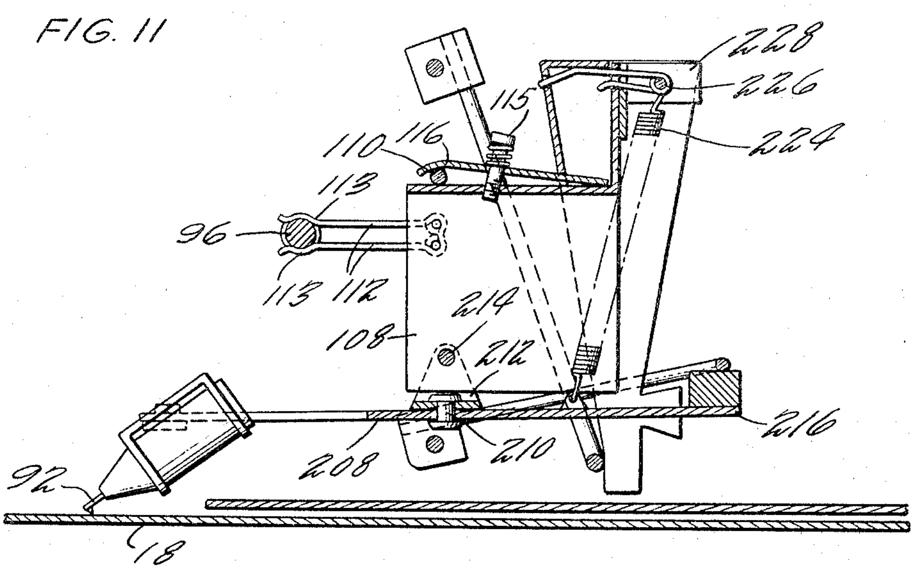
FIG. 11 is a sectional view substantially along the line 11—11 of FIG. 12.
Figures 12, 14:
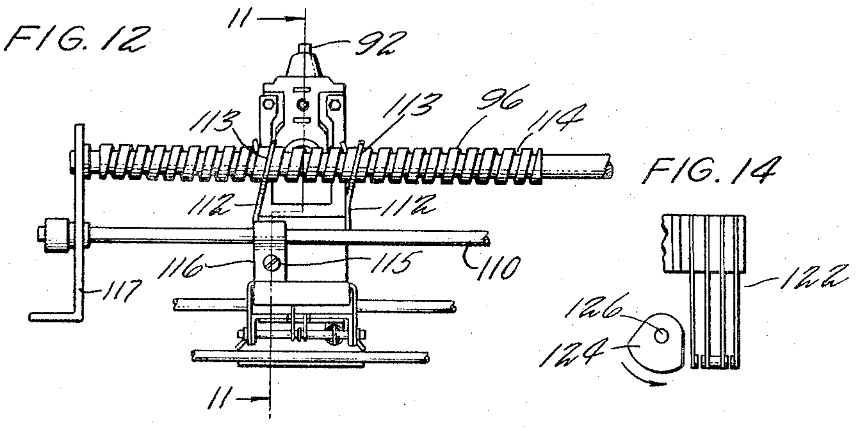
FIG. 12 is a plan view, with parts broken away to show the stylus and its support mechanism.
FIG. 14 is a sectional view along the line 14—14 of FIG. 13.
Figure 15:
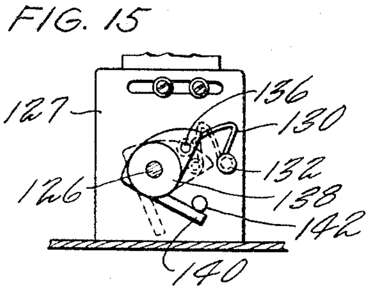
FIG. 15 is a sectional view along the line 15—15 of FIG. 13.

As shown in FIGS. 11 and 12, a carriage 108 for the stylus is guided by a rod 110 extending parallel to the lead screw 96 and is connected to the lead screw by a pair of spring clips 112 secured on opposite sides of the carriage and having projecting fingers 113 positioned on opposite sides of the lead screw 96, as shown, and engaging in the helical groove 114 in the lead screw. The lead screw 96 and the guide rod 110 are supported in the intermediate frame member 50 and an end frame member 117, FIG. 5. The carriage is held slidably on rod 110 by a clamp 116 held in position by a screw 115.

The stylus and carriage are shown substantially in mid-position for clarity. Assuming, however, that the stylus is in starting position at the left end of its travel, FIG. 11 (the outer periphery of the record), a record is inserted by opening the top lid 16 and raising the thumb latch 118 on the hinged arm 56. The record is then positioned over the conical end of the hollow pin 52 on the turntable, this positioning being assisted by locating pins 120 projecting from the top plate 24. A depression 121 in the corner of the top plate, FIG. 2, assists the user in holding the record while it is inserted or removed. When the record is in position and the hold-down disc has been placed in contact with the record by the movement of the hinged arm 56 toward the top plate 24, the cover 16 may be closed and the device is ready for operation.

The device is turned on by moving the off-on lever into "on" position. This lever turns on an amplifier and the motor 78 by closing a switch 122, FIG. 14, actuated by a cam 124 carried by the rod 126 to which the on-off lever 34 is attached. The rod is journalled in the panel 4 and in a support bracket 127 mounted on the top plate. When the control lever 34 is placed in "on" position it is held releasably in this position through a spring 130 positioned between a fixed pin 132 on the bracket 127 carried by the top plate 24 and a pin 136 on an arm 138 secured to the rod 126. It is obvious that this spring 130 will hold the arm 138 either in the full-line "off" position or in the dotted-line "on" position. The arm 138 carries a projection 140 for engagement with a pin 142 on the bracket 127 which limits the movement of the arm 138 beyond the full-line "off" position shown.

Figure 16:
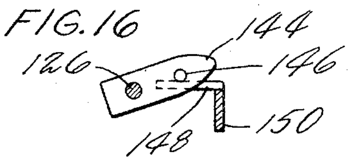
FIG. 16 is a sectional view along the line 16—16 of FIG. 13.

Moving the control lever 34 to "on" position also releases the drive mechanism for the record for movement of the drive mechanism into operative position. The rod 126 to which the control lever 34 is secured has an arm 144, FIG. 13, in which a projecting pin 146 is mounted. This pin 146 is in a position to engage with a projection 148 carried on the end of a lever 150, FIG. 16, the latter being mounted for pivotal movement on a cross rod 152 journalled in end plates 154 on the intermediate frame member 50. A spring 156 holds the projection 148 in contact with the pin 146 and urges the lever in a clockwise direction.

Figure 17:
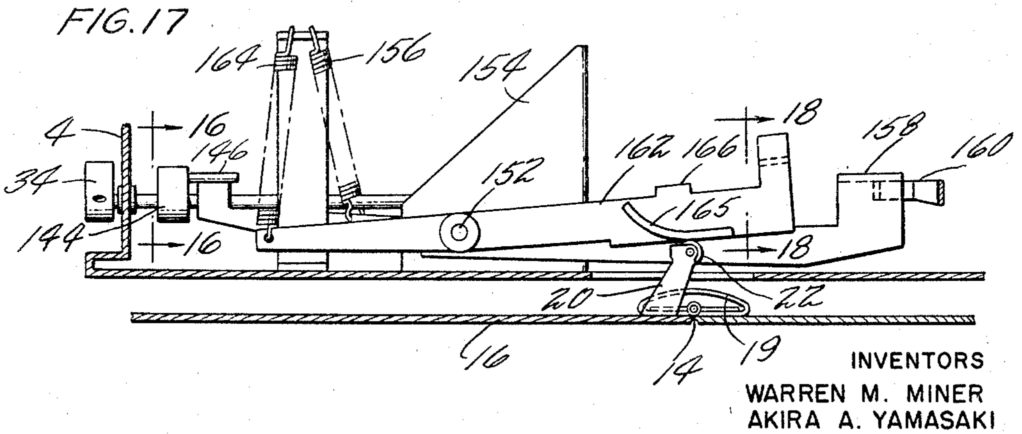
FIG. 17 is a side elevation of the mechanism controlling the drive motor.

Turning the control lever 34 to "on" position moves the projection 148 downwardly thereby moving the lever 150 against spring 156 in a counterclockwise direction and moving the right-hand end of the lever, as seen in FIG. 17, in an upwardly direction. This end of the lever carries a lateral tab 158 in a position to engage with a bar 160 located on and attached to the bracket 80 for the record driving motor. Upward movement of the right-hand end of the lever 150 accordingly allows both the motor bracket and the driving wheel bracket to move counterclockwise under the influence of the spring 86 and thus bring the driving wheel into engagement with the edge of the record and the motor pulley into engagement with the wheel.

In front of the lever 150, as seen in FIG. 17, is another lever 162 which is secured to the end of the cross rod 152 and causes the rod to turn with the lever. This lever is normally urged in a clockwise direction by a spring 164. With the cover closed, this lever 162 is held in the position shown in FIG. 17 by the roller 22 on the actuating arm 20 carried by the cover 16, this roller engaging an arcuate cam 165 on the lever 162. When the cover is opened for the purpose of replacing a record, the actuating arm 20 is moved to the left in FIG. 17 moving the roller 22 to the left on the cam 165 and also being moved downwardly by opening movement of the cover thus allowing the lever 162 to move in a clockwise direction. The lever 162 carried a projecting stop 166 thereon in a position to engage with the edge of the lever 150 thereby moving this lever clockwise so that the projection 158 on lever 150 engages and actuates the bar 160 and removes the driving mechanism out of engagement with the periphery of the record.

Figure 18:
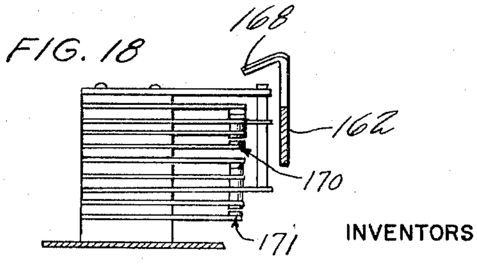
FIG. 18 is a sectional view along the line 18—18 of FIG. 17.

As the lever 150 moves clockwise the projection 148 thereon moves the pin 146 upwardly thereby moving the control lever 34 into "off" position. This motion also opens the switch 122 for the amplifier and the motor 78. A projecting arm 168, FIG. 18, mounted on the lever 162 engages and closes a switch 170 as the lever 162 moves clockwise for the purpose of returning the stylus to starting position.

The stylus is returned to starting position by a scanning motor 172, FIG. 9, having a pulley 174 in a position to engage with a rubber disc 176 secured on the end of the lead screw 96. When the motor 172 is driving the disc 176 the lead screw turns within the worm gear 98 through the medium of the clutch mechanism 104, above described, and the direction of rotation of the motor 172 is such that the stylus will be carried back to starting position. The motor 172 is set to operate at a speed to return the stylus to starting position at a faster rate than the traversing rate while the record is being played.

Figures 13, 19:
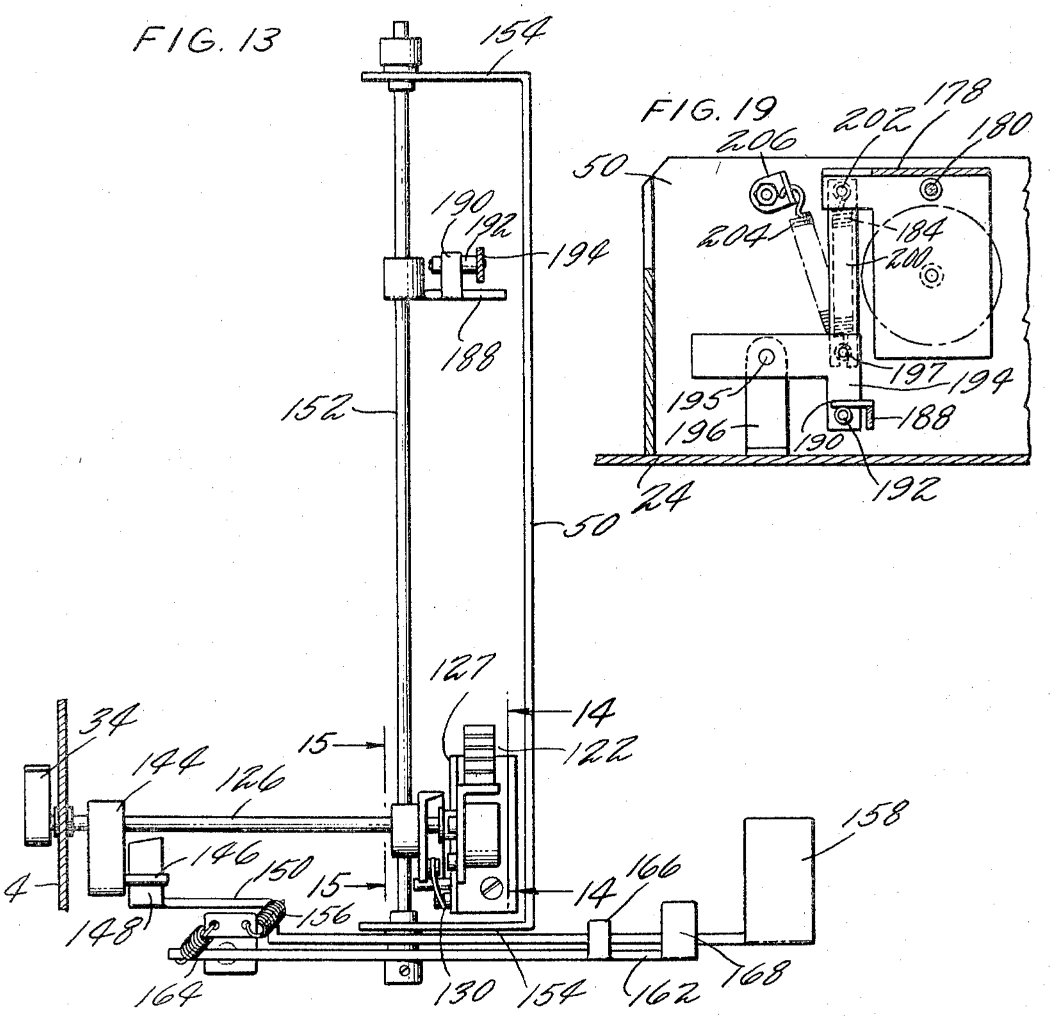
FIG. 13 is a fragmentary plan view of the mechanism actuated by the on-off lever.
FIG. 19 is a sectional view showing the scanning motor actuation.

The motor 172 is mounted in a bracket 178 pivoted on a rod 180 supported in the intermediate frame member 50 and in the end frame bracket 117, and is moved into driving engagement with the disc 176 through mechanism actuated by movement of the lever 162 which, as above stated, is moved in response to opening of the lid. The cross rod 152, to which the lever 162 is secured, and which extends crosswise of the chassis in parallel relation to the intermediate frame member, has an arm 188 thereon, FIG. 13, adjacent to the motor bracket 178. This arm has a projection 190, FIG. 19, thereon in a position to engage with a pin 192 on a movable bracket 194 pivoted on a pin 195 extending at right angles to the rod 152 and journalled in a support 196 on the plate 24. A pin 197, to which a spring 184 is attached, see FIG. 19, is also carried by the bracket 194 in spaced relation to pin 192. In addition to being engaged by the end of the spring 124, the pin 197 is also engaged by the bifurcated lower end of a link 200, the other end of which is pivoted to a pin 202 on the motor bracket 178. The upper end of spring 184 is also attached to the pin 202. Thus, when the rod 152 is turned through the action of the clockwise movement of the lever 162, the arm 188 pushes downwardly on pin 192 rocking the bracket 194 clockwise, FIG. 19, to carry the pin 197 downwardly thereby to allow movement of the motor bracket 178 about the axis of the supporting rod 180 so that the motor pulley may engage the rubber disc 176.

The bracket 194 is normally urged in a counterclockwise direction into the position shown by a coil spring 204 to hold the motor 172 in inoperative position. The spring 204 extends between the pin 197 and a bracket 206 attached to the intermediate frame member 50. When the pin 197 is moved downwardly, the bifurcated end of the lever 200 permits the pin 197 to continue to move downwardly after the motor pulley has engaged the disc 176 without causing continued pivotal movement of the motor and its mounting thereby resiliently holding the motor in operative position.

As shown in FIGS. 11 and 12, the stylus 92 is carried by a stylus mounting 208 which is supported by a pin 210 on a support 212, the latter being U-shaped and having the opposite ends located on opposite sides of the stylus carriage 108 and supported on a pin 214 for pivotal movement with respect to the carriage. The pin 214 extends parallel to the support rod 110 for the stylus carriage. The stylus and stylus mounting can move about the axis of this pin for retracting the stylus from the record or for moving the stylus into engagement with the record, as best shown in FIG. 11. A coil spring 224 extending between the end portion 216 of the mounting and a pin 226 carried by a projecting arm 228 on the stylus carriage 108 tends to urge the stylus mounting 208 in a direction normally to keep the stylus in contact with the record.

The motion of the stylus carriage on its return movement to starting position is limited by a limit switch 274, FIG. 5, mounted on a bracket 278 on the bracket 117 and in a position to be engaged by the carriage 108 as it reaches starting position. The limit switch 274 opens the circuit through the scanning motor by which movement of the stylus is caused so that the motor 172 will not continue to operate if the cover is kept open.

Referring now to FIG. 5, the record player is powered by a rechargeable battery 286 which supplies energy to both driving motor 78 and scanning motor 172 and to the amplifier. The circuits between the battery, the motors and the several control switches are not shown as these may be conventional circuits and appropriate interconnections will be apparent.

In operation, assuming no record is in place and the cover closed, a record is placed on the turntable by opening the cover and lifting up on the thumb latch end of the lever 56. A record is placed on the turntable and the lever 56 is urged toward the record to position the hold-down disc on the record. The cover is closed and the lever 162 is held in the position shown in FIG. 17, with the cam 165 against the roller 22. The lever 150 is held in the position shown in this figure by the pin 146 thus keeping the driving motor 78 and wheel 66 in inoperative position.

To play the record, the one-off switch lever is moved to "on" position. This moves lever 150 clockwise to allow the driving mechanism to become operative under the action of spring 86. Movement of control lever 34 also closes the switch 122 for the amplifier and driving motor 78. The rotation of the record by the driving mechanism drives the turntable and thus through the worm gear 98 drives the lead screw to advance the stylus at playing rate. This motion will normally continue until the record is finished. A limit switch 276, FIG. 5, on a bracket 278 engageable by the stylus carriage at this point may break the circuit through motor 78.

When the user wishes to replace a record whether at the end of the record, or at any time during the playing, the cover is opened. This cover movement moves the roller 22 carried by the cover along the cam 164 allowing lever 162 to move clockwise. The stop 166 on the lever 162 engages lever 150 and carries this lever clockwise also to return the control lever to "off" position through the medium of the pin 146. This movement of lever 150 also retracts the driving mechanism to inoperative position by means of the arm 160. Movement of lever 162 closes the switch 170 for energizing the scan motor 172 for rapid return of the stylus to starting position. Movement of the control lever to "off" position also opens the switch 122 for the amplifier and the driving motor 78.

Opening movement of cover 16 also moves scan motor 172 into operative position. As the cover opens and causes clockwise movement of lever 162 which is secured to cross rod 152, this rod turns carrying with it the arm 188. This arm moves bracket 194 clockwise, FIG. 18, to carry pin 197 down and cause the motor 172 to be rocked into driving position.

The user may now raise the lever 56 and remove the played record. When a new record is placed in position, the lever 56 is released to hold the record in place, and the cover closed, the record player is again ready for use.

The scan lever 40 actuates a rod 196 carrying a lever arm 258 with spaced pins 260 and 262 thereon in a position to engage a bar 256 on a bracket 252 by means of which the motor 172 is controlled for scanning the record. This subject matter is disclosed and claimed in copending application Ser. No. 372,830, filed June 5, 1964, having the same assignee as this application.

The amplifier system is mounted on panels 288, 290, 292 and 294, as shown in FIG. 5, and a plug 295 for a charging connection for the battery 286 is provided. Suitable rheostats 297 and 298 on the control knobs 38 and 36, respectively, provide for tone and volume controls in the amplifier as through conventional circuits.

It is to be understood that the invention is not limited to the specific embodiment herein illustrated and described, but may be used in other ways without departure from its spirit as defined by the following claims.

We claim:

1. A record player including a base, a turntable on the base for supporting a record, a stylus, a stylus carriage, guide means for guiding the carriage in a direction parallel to the plane of the record, and means for advancing the carriage including a lead screw parallel to the guide means, pivotally engaging means for driving the turntable, means for rotating said lead screw from said turntable, follower means on said carriage for engagement with the lead screw for moving said stylus in one direction relative to said record and second driving means for moving said stylus in an opposite direction relative to said record, said second driving means being a motor pivotably movable between an inoperative position and an operative position, and said second driving means being in said inoperative position during movement of said stylus in said one direction and in said operative position during movement of said stylus in said opposite direction.

2. A record player as in claim 1 in which said follower means are bifurcated and engage with opposite sides of the lead screw.

3. A record player as in claim 1 including means for moving said second driving means into operative position, and in which the second driving means is a motor, and wherein the lead screw has a driven disc fixed thereon for driving engagement by the motor.

4. A record player as in claim 1 in which the turntable supports a worm element and the lead screw has a cooperating worm gear thereon.

5. A record player as in claim 4 in which a friction clutch is provided between the worm gear and the lead screw.

6. In a record player, a base, a turntable on the base for supporting a record, a stylus having a starting position at the periphery of the record, a stylus carriage, guide means on the base for the carriage, and means for moving the carriage to advance the stylus during playing and to retract the stylus to starting position including a lead screw, drive means connecting the turntable to the lead screw, a clutch between the drive means and the lead screw, a connection between the carriage and the lead screw to traverse the carriage as the lead screw rotates, and other means independent of said drive means for turning the lead screw at a faster rate for retracting the stylus, said clutch providing for operation of said other means.

7. A record player as in claim 6 in which driving means are provided for engagement with the periphery of the record and the turntable is rotated thereby.

8. A record player as in claim 6 in which a limit switch at one end of the carriage travel stops the operation of the driving means then in operation.

9. A record player as in claim 6 in which a limit switch at the starting position of the stylus shuts down the other means when the carriage reaches starting position during retraction.

10. A record player as in claim 6 in which said other means includes a motor and a disc on the lead screw having driving engagement with the motor.

11. A record player as in claim 10 in which the motor is pivotally mounted to move the motor into driving engagement with the disc.

References Cited

UNITED STATES PATENTS

| | | | |
|---|---|---|---|
| 2,881,264 | 4/1959 | Kobler | 274—14 X |
| 3,023,011 | 2/1962 | Wagner | 274—13 X |
| 3,281,153 | 10/1966 | Logan | 274—14 |

NORTON ANSHER, *Primary Examiner.*

CLIFFORD B. PRICE, JOSEPH F. PETERS, Jr., *Assistant Examiners.*